INVENTOR:
ARTHUR E. HILLIKER,
BY D. Emmett Thompson
HIS ATTORNEY.

FIG.8

INVENTOR:
ARTHUR E. HILLIKER,
BY D. Emmett Thompson
HIS ATTORNEY.

FIG.9

INVENTOR:
ARTHUR E. HILLIKER,
BY D. Emmett Thompson
HIS ATTORNEY.

United States Patent Office 3,081,941
Patented Mar. 19, 1963

3,081,941
PARKING CONTROL SYSTEM
Arthur E. Hilliker, Pulaski, N.Y., assignor to Crouse-Hinds Company, Syracuse, N.Y., a corporation of New York
Filed Mar. 4, 1960, Ser. No. 12,708
1 Claim. (Cl. 235—99)

This invention relates to and has as an object a new and improved parking control system for use in a multi-space parking facility. The parking facility may be of th multi-area type such as a garage with several levels or a lot with several sections.

More specifically it is an object of this invention to provide a parking control system for a multi-space parking facility wherein the control system continuously indicates the number of unoccupied parking spaces available.

It is a further object of this invention to provide a parking control system of the type above set forth wherein the system comprises three separate components, a counter unit, an entrance unit and an exit unit, and wherein the entrance unit is rendered inoperative when all of the spaces available in the parking facility are occupied.

It is an additional object of this invention to provide a parking control system which cannot be actuated either by pedestrians or by vehicles moving in the wrong direction through the entrance and exit units.

Briefly described the parking control system comprising this invention comprises three units, a counter unit, an entrance unit and an exit unit. The counter unit is provided with a counter which continually indicates the number of unoccupied parking spaces available in the facility and includes means for indicating the availability and/or location of such parking spaces. The counter unit is interconnected with at least one entrance and one exit unit. The entrance and exit units are provided with detector means which are actuated by vehicles moving in a predetermined direction through the units to provide the counter unit with a single voltage pulse for each vehicle. The pulses from the entrance unit actuate the counter unit to reduce by one the total number of unoccupied parking spaces indicated on the counter and the pulses from the exit unit actuate the counter unit to increase by one the total number of unoccupied parking spaces indicated by the counter.

The invention consists in the novel features and in the combinations and constructions hereinafter set forth and claimed.

In describing this invention, reference is had to the accompanying drawings in which like characters designate corresponding parts in all the views.

Figure 1:
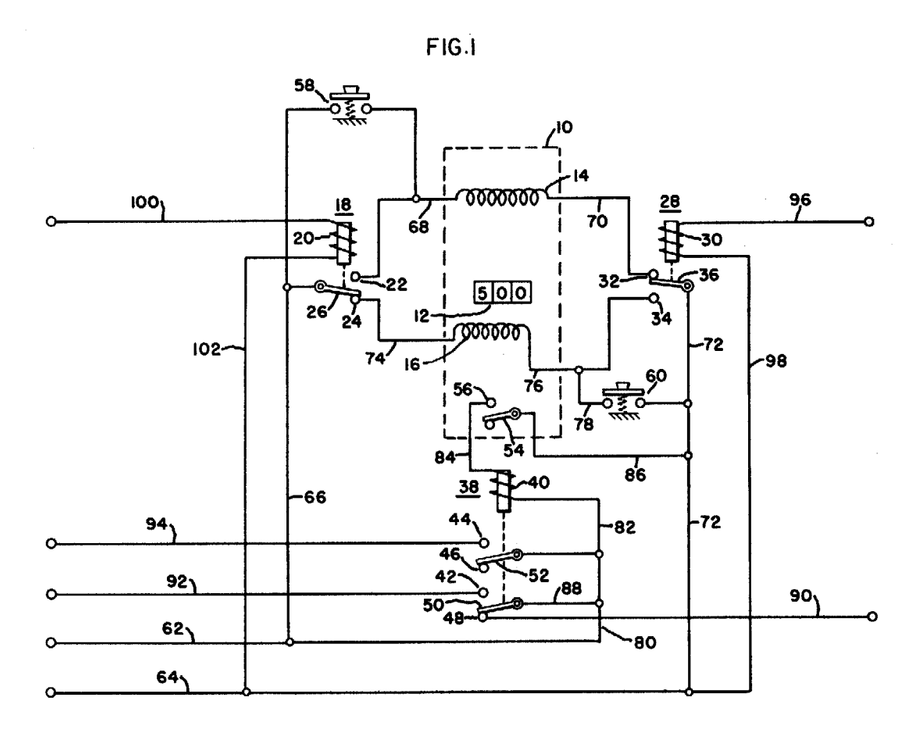
—
FIGURE 1 is a circuit diagram of the counter unit.

Referring now to FIGURE 1, the counter unit comprises an add-subtract counter, generally indicated by the dash lines 10, and is shown schematically as having a plurality of number wheels for continuously indicating the number of unoccupied parking spaces available. In the example shown in FIGURE 1, the counter has been selected for use in connection with a parking facility having a total of 500 parking spaces. The counter 10 includes an add solenoid coil 14 and a subtract solenoid coil 16 which are connected to any suitable means (not shown) for rotating the number wheels 12. The counter unit also includes an exit relay 18 having a coil 20, front and back contacts 22 and 24, and an armature 26; and an entrance relay 28 having a coil 30, front and back contacts 32 and 34 and an armature 36. The counter unit also includes a signal actuating relay 38 having a coil 40, a set of front contacts 42 and 44, and a set of back contacts 46 and 48, and a pair of armatures 50 and 52, the armature 50 moving between the contacts 42 and 48 and the armature 52 moving between the contacts 44 and 46. Finally, the counter unit includes a micro-switch having an armature 54 and a contact 56, the armature 54 being connected by any suitable means (not shown) to the wheels of the counter 10 whereby the micro-switch will be closed when the counter reads zero. The counter unit is also provided with a manual add switch 58 and a manual subtract switch 60.

At the beginning of each day the parking facility operator, or attendant will manually set the counter total at the capacity of the facility by the use of the manual add and subtract switches in the following manner. The counter unit is provided with a hot feed line 62 and a common return line 64 which are connected to a 117 volt 60 cycle power supply. The hot feed line is connected by line 66 through the manual add switch 58 to the line 68 which is connected to one side of the add solenoid coil 14. The opposite side of the coil 14 is connected by line 70, contact 32, armature 36 and line 72 to the common return line 64 whereby when the manual add switch 58 is closed a circuit will be completed through the add coil 14 to add one to the total number of unoccupied parking spaces indicated by the counter wheels 12. The line 66 is also connected to armature 26, contact 24 and line 74 which is connected to one side of the subtract solenoid coil 16. The opposite side of the coil 16 is connected by line 76 to line 78 which is connected through the manual subtract switch 60 to the line 72 which is connected to the common return line 64. Consequently, when the manual subtract switch 60 is closed a circuit is made through the coil 16 whereby energizing the subtract solenoid to reduce by one the number of unoccupied parking spaces indicated by the counter wheels 12.

Thereafter, by means to be described hereinafter, each time a vehicle enters the facility the coil 14 is energized to reduce by one the number of unoccupied parking spaces indicated by the counter 10 and each time a vehicle leaves the facility, coil 16 is energized to increase by one the number of unoccupied parking spaces indicated by the counter 10. When all of the parking spaces are occupied and the wheels 12 thus indicate zero spaces available, suitable means (not shown) are actuated to close the micro-switch 54. The closure of the switch 54 completes a circuit from the hot line 62 to line 80 which is connected by line 82 to one side of the coil 40 of relay 38. The opposite side of coil 40 is connected by line 84 to the contact 56 and the circuit is completed through the micro-switch armature 54 and line 86 which is connected by line 72 to the common return line 64 thereby energizing the relay 38.

Prior to the energization of the relay 38, a circuit was completed from the hot feed line 62 through line 80 to line 88 which is connected to the armature 50 of relay 38 and through the contact 48 to the line 90 which in turn is connected to any suitable signal means (not shown) for indicating to vehicle operators that parking space is available in the parking facility. Upon energization of the relay 38 through the circuit above described the armature 50 is moved into engagement with the contact 42 thereby completing a circuit from the hot feed line 62 through line 80, line 88, armature 50 and contact 42 to line 92 which is connected to any suitable signal means (not shown) for indicating to vehicular traffic that no parking spaces are available in the entire facility or in a particular area of the facility. This signal means may also direct traffic to another area.

The energization of the relay 38 also completes a circuit from the hot feed line 62 through line 80 to the armature 52 which engages the contact 44 and is connected by line 94 to the entrance unit to render inoperative the entrance unit, as will be hereinafter described in detail.

After the attendant, or operator of the parking facility has manually set the counter 10, as above described, each time a vehicle enters the facility a pulse will be fed from the entrance unit by means to be described hereinafter in connection with the description of the entrance unit through line 96 and coil 30 of the relay 28 to line 98 which is connected to the common return line 64 thereby momentarily energizing the relay 28. The energization of relay 28 moves the armature 36 downward into engagement with the contact 34 thereby completing a circuit from the hot feed line 62 through line 66, armature 26 of relay 18, contact 24, line 74, coil 16 of the subtract solenoid, line 76, contact 34, armature 36 of relay 28 and line 72 to the common return line 64 thereby energizing the subtract solenoid to reduce by one the total number of unoccupied parking spaces indicated by the counter 10.

Each time a vehicle leaves the parking facility a voltage pulse will be placed, by means to be hereinafter described in connection with the description of the exit unit, on line 100 which is connected to the common return line 64 thereby momentarily energizing the relay 18. When the relay 18 is energized the armature 26 moves upwardly into engagement with the contact 22 thereby completing a circuit from the hot feed line 62 through line 66, armature 26, contact 22, line 68, add solenoid coil 14, line 70, contact 32, armature 36 and line 72 which is connected to the common return line 64 thereby energizing the add solenoid to increase by one the total number of unoccupied parking spaces indicated by the counter 10.

As will be obvious, in the event of a simultaneous entrance and exit of vehicles from the parking facility both relays 18 and 28 will be momentarily energized thereby preventing energization of either of the add or subtract solenoid coils 14 or 16, consequently preventing any count from taking place in the counter 10 thereby preventing the unit from being damaged or indicating an incorrect total.

The means for providing the line 96 and 100 with voltage pulses in response to the entrance and exit of vehicles from the facility will next be described.

Figure 2:
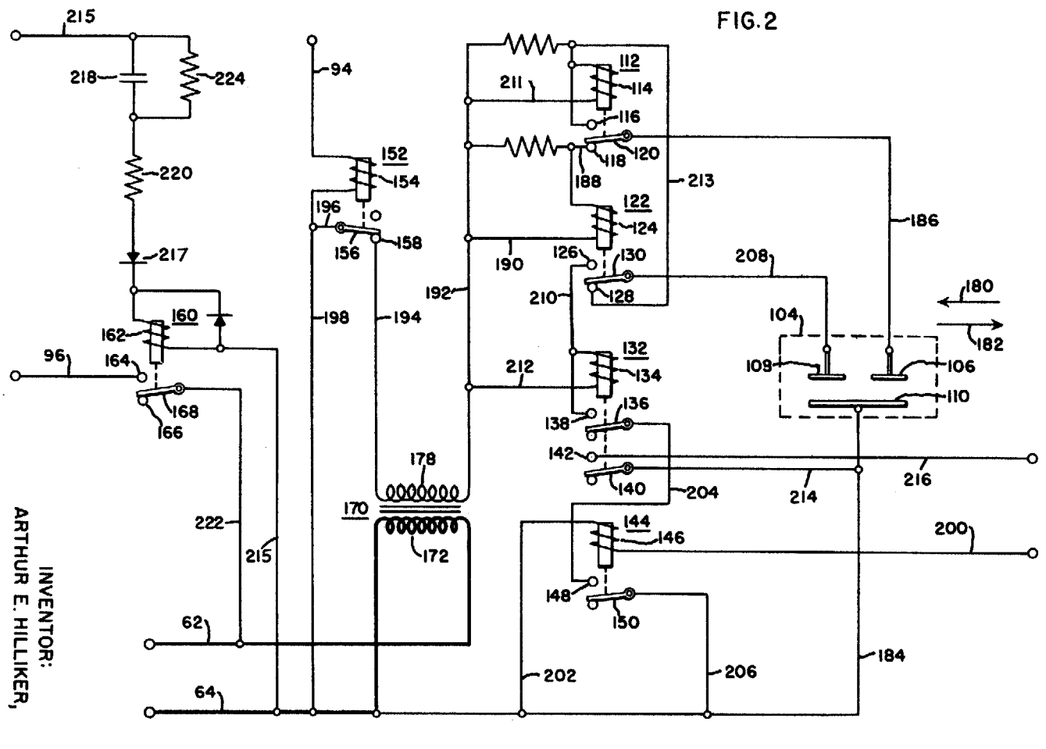
FIGURE 2 is a circuit diagram of the entrance unit.

Referring now to FIGURE 2, the entrance units shown in the normal condition is provided with a vehicle detector, generally indicated by the dash lines 104, which is imbedded in the entrance of the parking facility.

The detector 104 includes a pair of spaced-apart upper contacts 106 and 108 and a bottom contact 110 common to both of the upper contacts.

The entrance unit includes a relay 112 having a coil 114, front and back contacts 116, 118 and an armature 120; a relay 122, having a coil 124, front and back contacts 126, 128 and an armature 130; a relay 132 having a coil 134, an armature 136 co-operable with a contact 138 and a second armature 140 co-operable with a contact 142; a relay 144 having a coil 146, front contact 148 co-operable with armature 150; a relay 152 having a coil 154, an armature 156 and a contact 158; a relay 160 having a coil 162, a front contact 164, a back contact 166 and an armature 168; and a transformer 170 having a primary coil 172 connected across the hot feed line 62 and the common return line 64 of the power supply and a secondary coil 178.

The entrance unit, shown in FIGURE 2, is designed to operate in conjunction with a ticket dispensing machine of the type disclosed in my copending application, No. 814,769 filed May 21, 1959, now Patent No. 2,985,862. Briefly described the entrance unit operates in conjunction with the ticket dispensing machine whereby when a vehicle detection is received by the detector 104, a ticket is issued by the ticket dispensing machine and thereupon a voltage pulse is provided to the counter unit for indicating the entrance of a vehicle into the parking facility.

It will be understood that the entrance unit may be also set up to operate without the aid of the ticket dispensing machine and has a vehicle detector circuit which will only detect vehicles in a manner whereby the total number of impulses received is divided by two and the result is transmitted to the counter thereby allowing only one impulse from the two axles of each vehicle to be recorded on the counter thereby resulting in a single count for each vehicle entering the facility. As shown in FIGURE 2, the arrow 180 indicates the proper entering direction of the vehicle for actuation of the detector circuit and the arrow 182 indicates the improper direction which will not actuate detector circuits.

Figure 4:
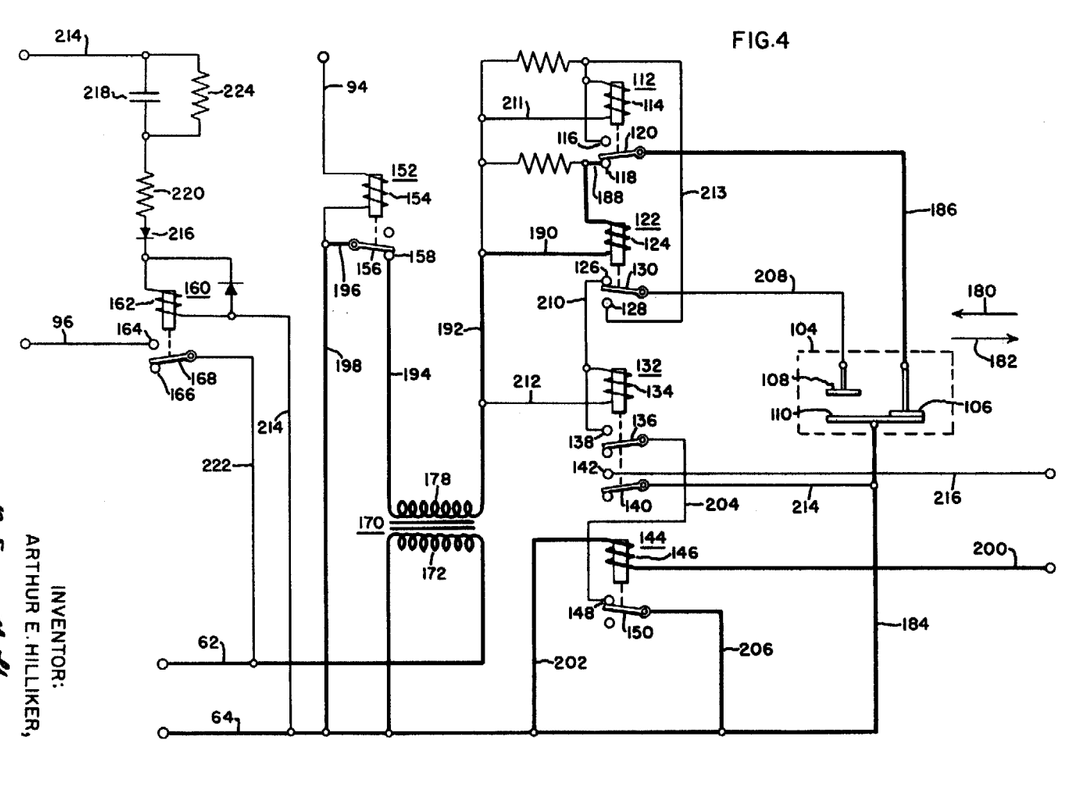
FIGURES 4 and 5 are illustrations of the entrance unit in operation wherein the heavy lines indicate the portions of the circuit then conducting current.

As shown in FIGURE 4, when a vehicle enters in the direction of arrow 180, contact 106 will engage the common contact 110 completing a circuit from the common return line 64 through line 184, contact 110, contact 106, line 186, armature 120, contact 118, line 188, coil 124 of relay 122, line 190, line 192, secondary coil 178 of transformer 170, line 194, contact 158, armature 156, line 196, and line 198 which is also connected to the common return line 64 thereby energizing the relay 122 from the secondary of the transformer 170. At the same time the line 200, which is connected to a hot feed from the ticket dispensing machine, this hot feed being maintained until issuance of the ticket, completes a circuit through coil 146 of relay 144 to line 202 and the common return line 64 thereby energizing relay 144 and moving the armature 150 into engagement with the contact 148 which supplies ground feed to the armature 136 of relay 132 through the line 204, contact 148, armature 150 and line 206.

Figure 5:
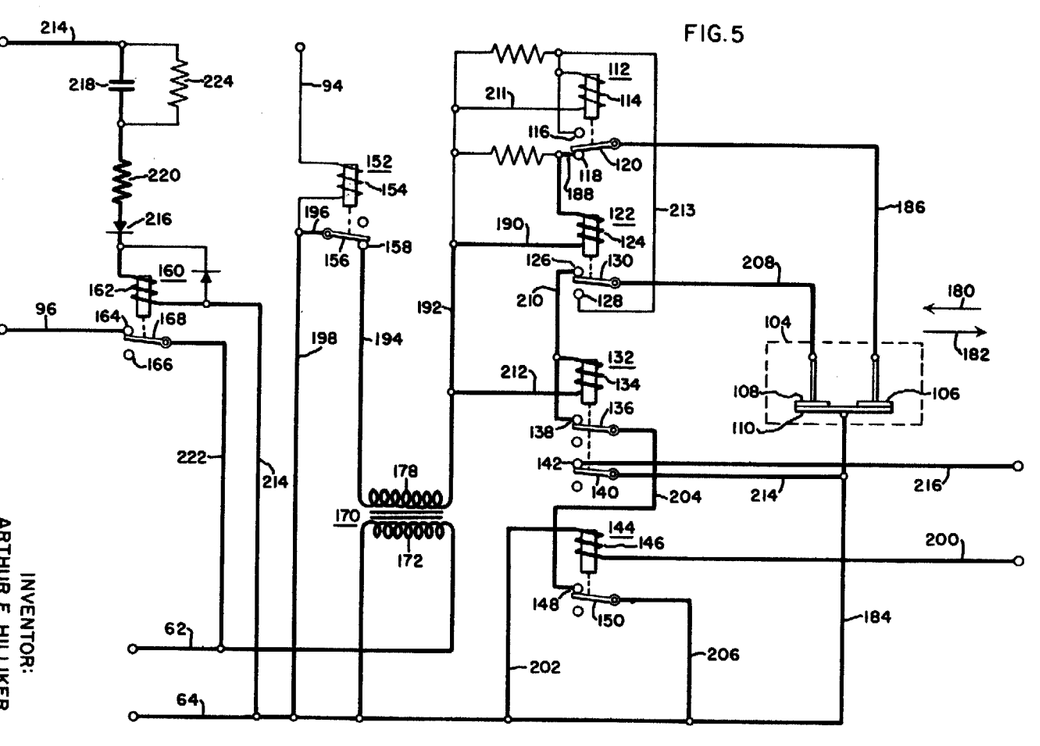

As best seen in FIGURE 5, continued movement of the vehicle causes contact 108, in the detector 104 to engage the common lower contact 110 and at the same time contact 106 is still in engagement with the lower common contact 110 holding the armature 130 of relay 122 in engagement with the contact 126. The engagement of contact 108 with contact 110 in the detector completes the circuit from the common return line 64 through line 184, contact 110, contact 108, line 208, armature 130, contact 126, line 210, coil 134 of relay 132, line 212 which is connected through the secondary 178 of transformer 170 to the common return as previously described thereby energizing relay 132. The energization of the relay 132 connects the ground feed supplied to armature 136 through the relay 144 as previously described to the contact 138 of relay 132 thereby holding the ground feed on the relay 132 until a ticket is issued. The energization of the relay 132 causes a ticket to be issued through a circuit comprising line 184 which is connected to the common return line 64, line 214, armature 140, contact 142, and line 216, which is connected to the ticket dispensing machine and the connection of this line to the ground line 64 causes the ticket to be issued. The issuance of the ticket by the ticket dispensing machine removes the hot feed from line 200 through the circuitry of the ticket dispensing machine (not shown) which de-energizes the relay 144 which in turn insures the energization of relay 132 for a sufficient amount of time to permit proper operation of the ticket dispensing machine in the event of fast moving vehicles crossing the detector 104.

Because of the necessity for actuating the detector contacts 106, 108 and 110 in the sequence above described, the possibility of a pedestrian walking over the detector and operating the machine is extremely remote.

When a vehicle has crossed over the detector 104, and as described above causes a ticket to issue, a hot feed is supplied by the ticket dispensing machine to line 215 located to the left of FIGURE 5 which energizes the pulse circuit to the left of FIGURE 5 which energizes the pulse circuit to be next described. The pulse circuit comprises a half-wave rectifier 217 connected in the line 215 in series with the coil 162 of relay 160, a capacitor 218 and a current limiting resistor 220, the line 215 being connected to the ground line 64 at the opposite side of the coil 162. Current will flow in the pulse circuit only for the time required for the capacitor to be fully charged which is only for a few milliseconds. Consequently the relay 160 will be energized only for a corresponding amount of time thus momentarily moving the armature 168 upward into engagement with the contact 164 and providing a hot feed to the line 96 from the line 222 which is connected to the hot feed line 62 thereby supplying the counter unit of FIGURE 1 with a voltage pulse through the line 96. This pulse circuit will now remain inoperative and the armature 168 will return to engagement with the contact 166 upon de-energization of the relay 160 and the circuit will remain in this condition until the hot feed is removed from the line 215, by the ticket dispensing machine after which capacitor 218 will discharge through the resistor 224 which is connected across the capacitor 218.

As previously described the pulse on line 96 serves to decrease by one the total number of unoccupied parking spaces indicated by the counter 10.

When the counter wheels 12 reach zero the switch 54 will be closed as previously described causing the energization of relay 38 which in turn connects a hot feed to the line 94 as is also described in connection with FIGURE 1. This completes a circuit through the coil 154 of relay 152 to line 198 which is connected to the common return line 64 thereby energizing relay 152. The energization of relay 152 opens the ground circuit to the secondary 178 of transformer 170 thereby rendering inoperative the detector circuits described in connection with FIGURE 2. This is a highly advantageous feature in that it prevents any operation and consequent damage to the counter 10 should a vehicle enter the parking facility when there are no more unoccupied parking spaces available.

At the same time, as previously described, the energization of the relay 38 also de-energizes the signal system connected to line 90 and energizes the signal system connected to line 92 which latter signal system may be utilized to indicate that a particular section or area of the facility is full and may direct traffic to another area or section of the facility.

Figure 3:
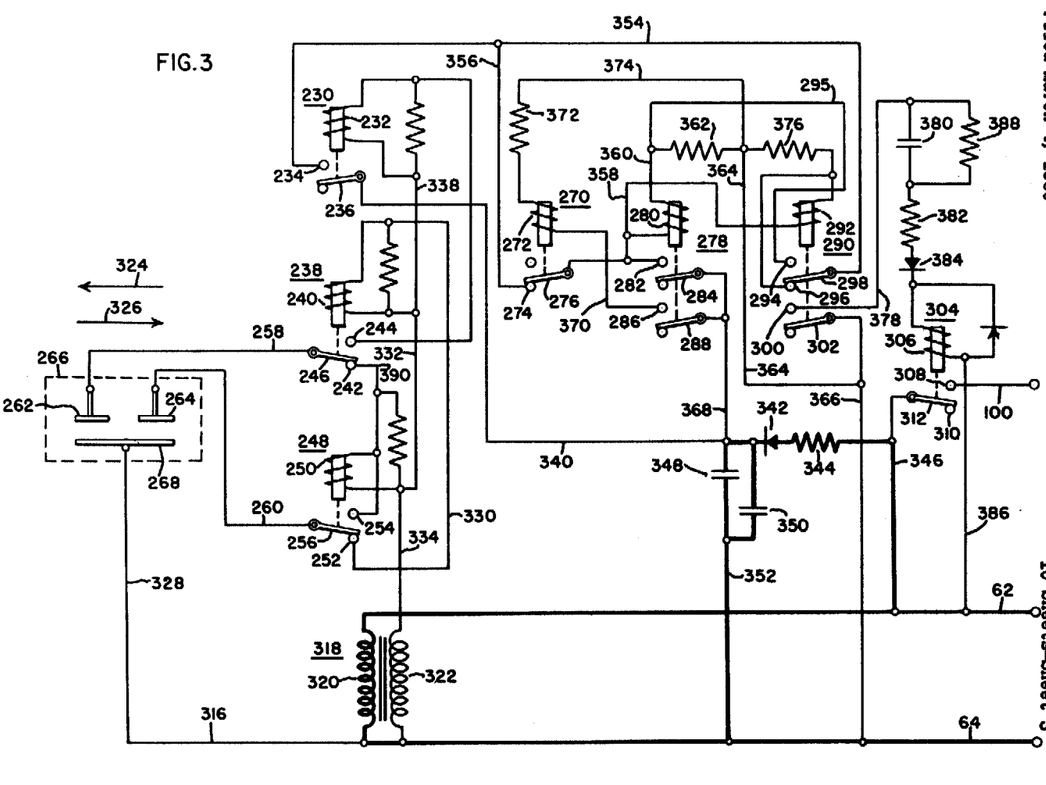
FIGURE 3 is a circuit diagram of the exit unit.

Referring now to FIGURE 3, the exit unit comprises a relay 230 having a coil 232, contact 234 and an armature 236; relay 238 having a coil 240, contacts 242 and 244 and an armature 246 and relay 248 having a coil 250, contacts 252, 254 and an armature 256. The relay armatures 246 and 256 are connected in circuit by lines 258 and 260 respectively, with the second upper contact 262 and first upper contact 264 of the exit detector generally indicated by the dash lines 266 which is imbedded in the exit of the facility and which includes a lower common contact 268. The exit unit also includes relay 270 having a coil 272, contact 274 and armature 276; relay 278 having a coil 280, contact 282, armature 284, contact 286 and an armature 288; relay 290 having a coil 292, contacts 294 and 296, armature 298, contact 300 and armature 302; relay 304 having a coil 306, contacts 308 and 310, and an armature 312. The exit unit is provided with the hot feed line 62 and the common return line 64 which are connected to the power supply. A transformer 318 has its primary 320 connected across the lines 62 and 64 and its secondary 322 connected at one side to the common return line 64.

With reference to the detector 266, the arrow 324 indicates the proper exiting direction of the vehicle for actuation of the detector circuit and the arrow 326 indicates the improper direction which will not actuate the detector circuits.

Figure 6:
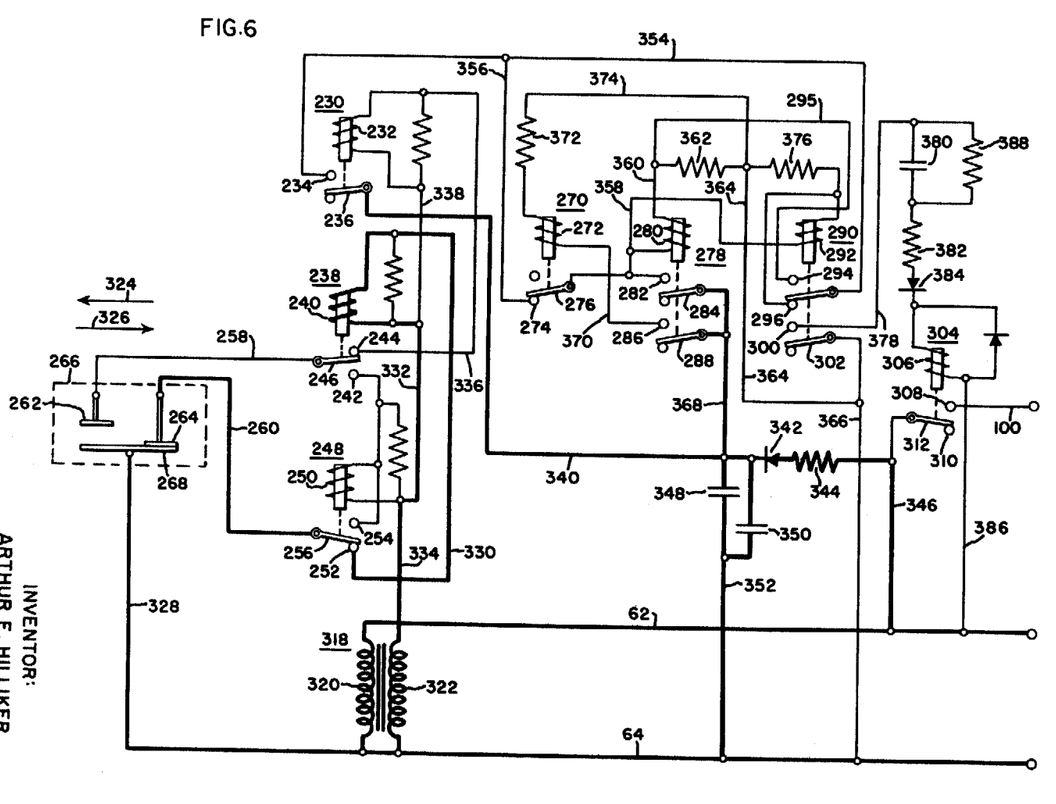
FIGURES 6 to 10 inclusive, are illustrations of the exit unit in operation wherein the heavy line indicate the portions of the circuit then conducting current.

Referring to FIGURE 6, as a vehicle leaves the parking facility in the direction of the arrow 324, contact 264 will engage contact 268 in the detector 266 thus completing a circuit from the common line 64 through line 328, contacts 268 and 264, line 260, armature 256 and contact 252 of relay 248, line 330 through the coil 240 of relay 238 to line 332 which is connected by line 334 to the secondary 322 of the transformer thereby energizing relay 238 and moving the armature 246 upward into engagement with the contact 244.

Figure 7:
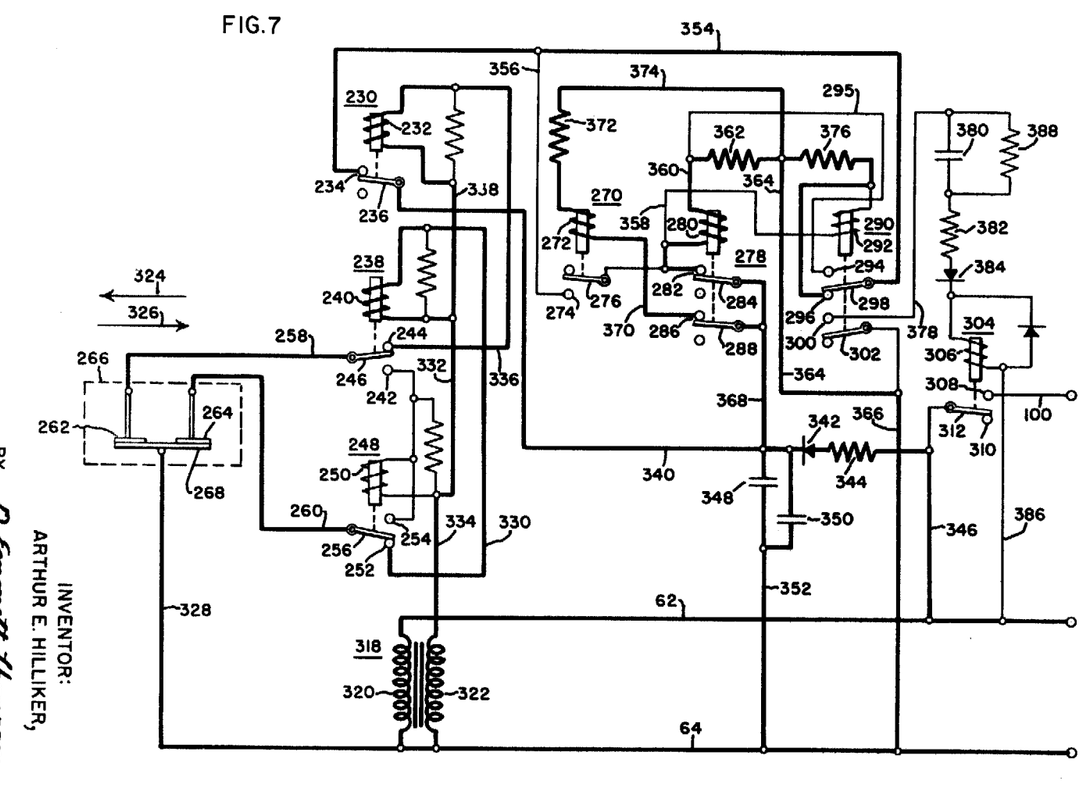

With reference to FIGURE 7, as the vehicle continues over the detector 266, the contact 262 will engage the contact 268 of the detector while the contact 264 is still in engagement with the contact 268. The engagement of contact 262 with contact 268 completes a circuit from the common return line 64 through line 328, contacts 268 and 262, line 258, armature 246 and contact 244, line 336, coil 232 of relay 230 to line 338 which is connected through line 332 and 334 to the secondary of the transformer 318 thereby energizing the relay 230 and moving the armature 236 into engagement with the contact 234. The armature 236 is supplied with a positive D.C. power supply from line 340 which is connected through a rectifier 342 and resistor 344 to line 346 which is connected to the hot feed line 62, the resistor 344 and rectifier 342 serving to charge to line potential a pair of capacitors 348 and 350 having their positive side connected to the line 340 and their negative side connected to line 352 which is connected to the common return line 64 consequently providing the line 340 with a positive D.C. power supply.

The energization of relay 230, as above described, connects the D.C. power supply on line 340 through the armature 236 and contact 234 to line 354 which is connected through armature 298 and contact 296 of relay 290 to one side of the coil 292. At the same time, however, referring now also to FIGURE 6, the D.C. power is supplied to the opposite side of the coil 292 through the circuit comprising line 340, armature 236 (which is now in its upper position by virtue of the energization of relay 230), contact 234, line 354, line 356, contact 274, armature 276, line 358 to the lower side of coil 292. Since both sides of the coil 292 are at the same potential, the relay 290 is not energized. The D.C. power supplied by the circuit just described to line 358 completes a circuit, as shown in FIGURE 7, through coil 280 of relay 278 which at its opposite side is connected to line 360 through resistor 362 to line 364 which is connected to line 366 which in turn is connected to the ground return line 64 thereby energizing relay 278 moving the armature 284 into engagement with contact 282 and armature 288 into engagement with the contact 286. This completes a circuit from the D.C. power supply on line 340 through line 368, armature 288, contact 286, line 370, coil 272 of relay 270, resistor 372, line 374, line 364 and line 366 which is connected to the common return line 64 thereby energizing relay 270, which in turn moves the armature 276 out of engagement with the contact 274. Relay 278, however, remains energized through contact 282 and armature 284 which are connected to the D.C. power supply.

Figure 8:
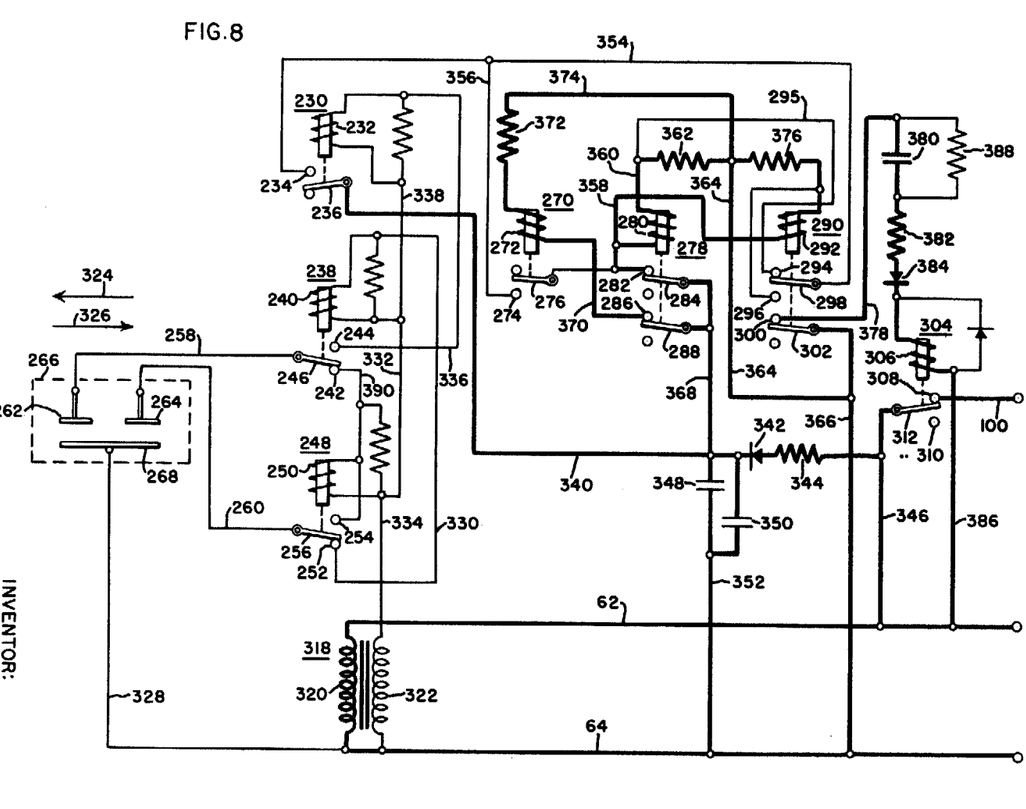

As the front wheels of the vehicle pass off of the detector 266, as shown in FIGURE 8, relays 238 and 230 become de-energized. The de-energization of relay 230 returns the armature 236 to its lower position out of engagement with the contact 234 thereby removing the D.C. power supply from the upper side of the coil 292 of relay 290. The previous energization of the relay 278, however, maintains the D.C. power supply on the lower side of coil 292 thereby completing a circuit through the coil 292, resistor 376, line 364 and line 366 which is connected to the ground return line 64 thereby energizing the relay 290 moving the armature 302 into engagement with the contact 300 and the armature 298 into engagement with contact 294.

The engagement of the armature 302 with the contact 300 completes a pulse circuit similar to that described in connection with the description of the entrance unit shown in FIGURE 2, consisting of ground supply line 64, line 366, armature 302, contact 300, line 378, capacitor 380, resistor 382, rectifier 384 and coil 306 of relay 304, the opposite side of which is connected by line 386 to the hot feed line 62. Current will flow in this pulse circuit only for the time required for the capacitor 380 to become fully charged which only amounts to a few milliseconds. Consequently, relay 304 will be energized only for a corresponding amount of time thus momentarily moving the armature 312 into engagement with the contact 308 thereby providing a hot feed from line 62 through line 346, armature 312 and contact 308 to line 100 thus providing the counter unit with the voltage pulse through the line 100 to actuate the counter 10 as described in connection with FIGURE 1. The pulse circuit will now remain inoperative and the armature 312 will return into engagement with the contact 310 upon de-energization of the relay 304 and the circuit will remain in this condition until the hot feed is removed from line 386 after which the capacitor 380 will discharge through the resistor 388 which is connected across the capacitor.

As previously set forth, the voltage pulse supplied to the line 100 serves to increase by one the total number of unoccupied parking spaces indicated by the counter 10.

Figure 9:
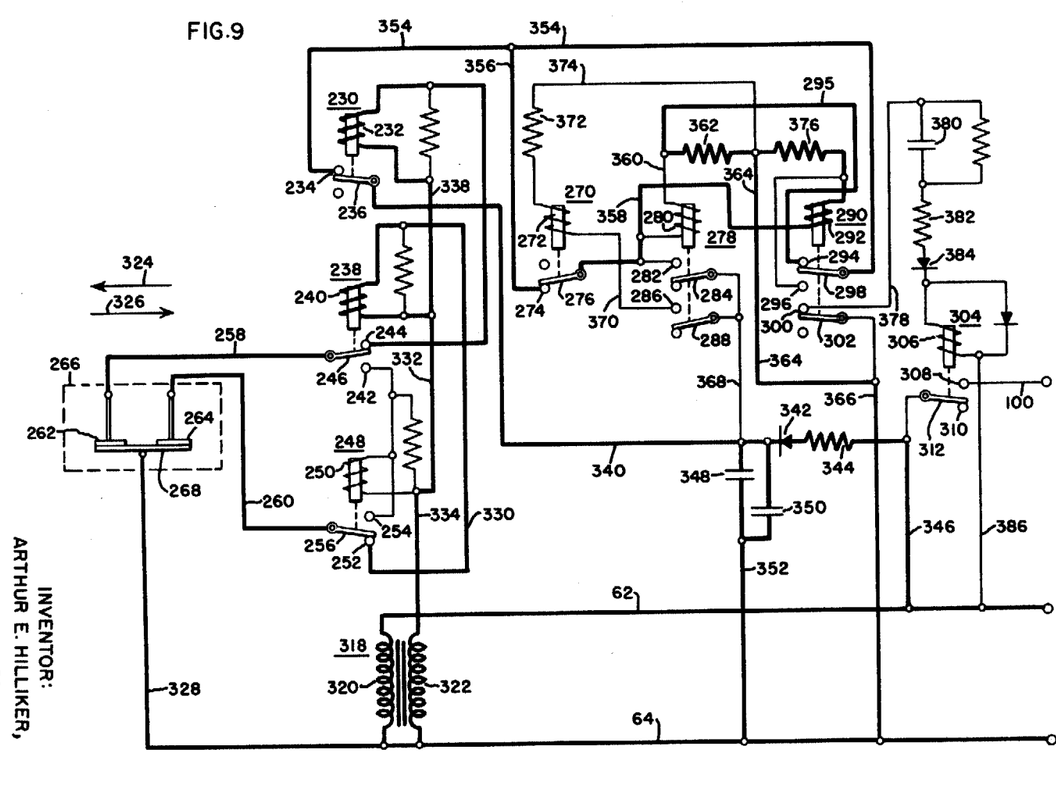

Referring now to FIGURE 9, as the rear wheels of the vehicle move on to the detector 266 relays 230, 238 and 248 operate in the manner described above. Relay 290, however, is maintained in the energized state, as shown in FIGURE 8, by the circuit from the D.C. power supply on line 340 through line 368, armature 284, contact 282, line 358, coil 292 of relay 290, resistor 376, line 364 and line 366 which is connected to the ground supply line 64. As relay 230 is energized, referring again to FIGURE 9, the D.C. power supply from line 340 will be supplied to the upper end of coil 280 of relay 278 through line 354, armature 298, contact 294 and line 295 to the upper side of coil 280 thereby placing both sides of the coil 280 at the same potential and de-energizing the relay 278. The de-energization of relay 278 causes the armature 288 to separate from the contact 286 thereby de-energizing relay 270. Relay 290, however, remains energized through the circuit comprising line 340 which is connected to the D.C. power supply, armature 236, contact 234, line 354, line 356, contact 274, armature 276, line 358 and coil 292 of relay 290 through resistor 376, line 364 to line 366, which in turn is connected to the ground supply line 64 thereby maintaining the relay 290 in the energized state.

Figure 10:
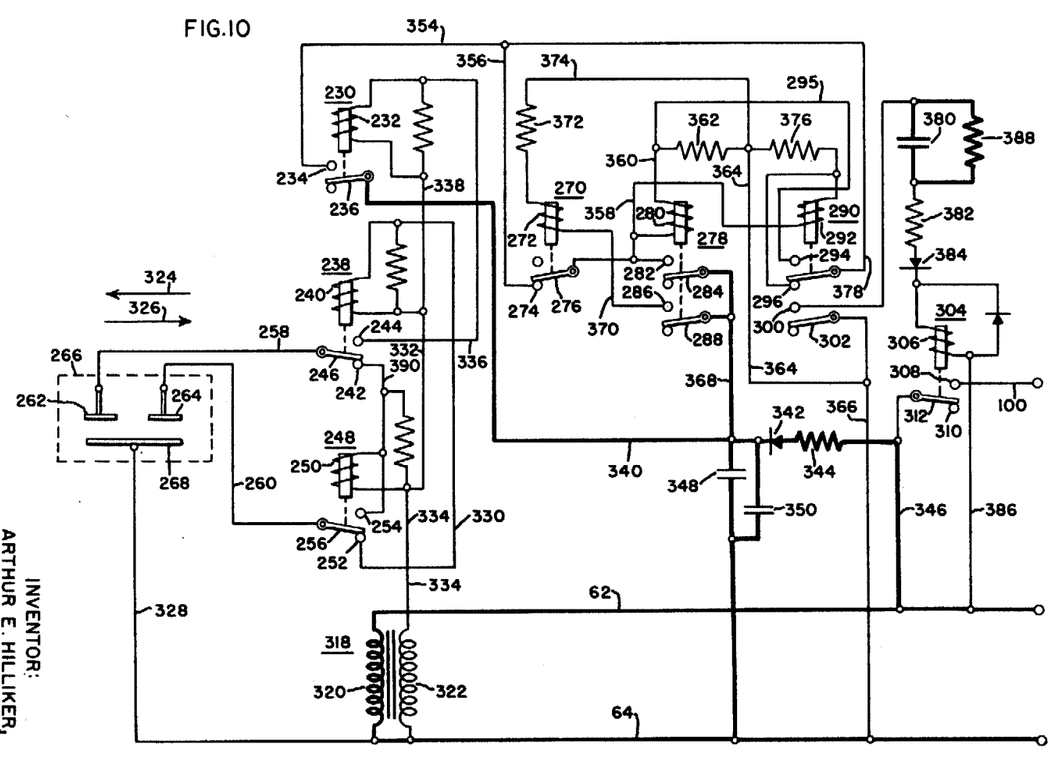

As the rear wheels of the vehicle pass off of the detector 266, as shown in FIGURE 10, relay 230 will be de-energized thereby removing the D.C. voltage supply to the relay 290 de-energizing the relay 290 which in turn removes the ground supply from the pulse circuit upon the opening of the armature 302. Hence it will be seen that a single voltage pulse is transmitted across the line 100 to the counter unit for each vehicle even though the detector 266 is actuated once for each set of wheels of the vehicle.

Experimental tests have indicated that a maximum of three entrance and three exit units may be connected in parallel with each other and the counter unit whereby parking facilities having as many as three entrances and three exits may utilize the parking control system comprising this invention. As will also be obvious, in a multi-area parking facility each area may be supplied with the counter, entrance and exit units and the signals connected to the line 92 may direct the vehicular traffic to another area when the first area is filled.

As previously set forth the entrance unit supplies the counter unit with a voltage pulse only when a vehicle enters or crosses detector 104 in the direction of arrow 180. For example, referring again to FIGURE 2, if a vehicle should cross the detector 104 in the direction of arrow 182 contact 108 would first be urged into engagement with the lower common contact 110 thereby completing a circuit from a secondary 178 of the transformer 170 through line 192, line 211, coil 114 of relay 112, line 213, contact 128 and armature 130 of relay 122, line 208, contacts 108 and 110 of detector 104 and line 184 which is connected to the common return line 64. This circuit serves to energize relay 112 and move its armature 120 into engagement with the contact 116. Thereafter as the wheels of the vehicle continue over the detector 104 in the direction of the arrow 182 contact 106 will be urged into engagement with the contact 110 providing an alternate path for the ground feed from the contact 116 and armature 120 through line 186, contacts 106 and 110 of detector 104 and line 184 thereby preventing the energization of the relay 122 and holding the relay 112 energized until the vehicle clears the detector 104.

Similarly, referring to FIGURE 3, if a vehicle should pass over the detector 266 in the direction of the arrow 326, contact 262 would be urged into engagement with the contact 268 completing a circuit from the ground feed line 316 through line 328, contacts 268 and 262 of detector 266, line 258, armature 246 and contact 242 of relay 238 to line 390 which is connected to one side of the coil 250 of relay 248, the opposite side of which is connected by line 334 to the secondary 322 of transformer 318. This energizes the relay 248 moving the armature 256 upward into engagement with the contact 254 which provides an alternate path to hold relay 248 energized when the wheels of the vehicle urge contact 264 into engagement with contact 268 of the detector 266 through the line 260, armature 256, contact 254 and line 390 which is connected through the coil of relay 248, as just described, thereby holding the relay 248 energized until the wheels of the vehicle have passed off of the detector 266 and preventing the energization of relays 230 and 238.

What I claim is:

A parking control apparatus comprising a counter unit having means or continuously visually indicating the number of available parking spaces in a parking facility, said counter unit being connected to at least one entrance unit, said entrance unit including a uni-directional detector means adapted to be actuated only in response to vehicles entering said facility through said entrance unit, said entrance unit being operable to provide a single voltage pulse to said counter unit for each vehicle entering said facility, said counter unit adapted to be connected to a plurality of exit units, each of said exit units having detector means operable to provide said counter unit with a single voltage pulse for each vehicle passing out of said facility through said exit unit, said detector means in said exit unit being operable to provide said single voltage pulse for each pair of actuations of said detector means by the first and second wheel sets of vehicles existing from said facility, each voltage pulse from said entrance unit operating subtract means in said counter unit to decrease by one the indicated total available parking spaces in said facility, said voltage pulse from said exit unit operating add means in said counter unit to increase by one the indicated total available parking spaces in said facility, manual means in said counter for actuating said add and subtract means, said counter unit being operable in response to simultaneous voltage pulses from said entrance and exit units, to render inoperative said add and subtract means to leave unchanged the indicated total available parking spaces said counter unit including means operable when no available parking spaces are indicated to render said entrance unit inoperative.

(References on following page)

References Cited in the file of this patent

UNITED STATES PATENTS

| | | |
|---|---|---|
| 90,435 | Dubois | May 25, 1869 |
| 1,836,655 | Dunford | Dec. 15, 1931 |
| 2,077,924 | Geer et al. | Apr. 20, 1937 |
| 2,482,610 | Burn | Sept. 20, 1949 |
| 2,528,790 | Scherer | Nov. 7, 1950 |
| 2,644,150 | Burn | June 30, 1953 |
| 2,906,505 | Orr et al. | Sept. 29, 1959 |
| 2,947,591 | Henry et al. | Aug. 2, 1960 |
| 3,006,549 | Hughes | Oct. 31, 1961 |

UNITED STATES PATENT OFFICE
CERTIFICATE OF CORRECTION

Patent No. 3,081,941                                  March 19, 1963

Arthur E. Hilliker

It is hereby certified that error appears in the above numbered patent requiring correction and that the said Letters Patent should read as corrected below.

Column 1, line 62, for "line" read -- lines --; column 2, line 41, for "whereby" read -- thereby --; column 7, line 5, for "descritpion" read -- description --; column 8, line 44, for "or" read -- for --; column 8, line 59, for "existing" read -- exiting --.

Signed and sealed this 8th day of October 1963.

(SEAL)
Attest:

ERNEST W. SWIDER
Attesting Officer

EDWIN L. REYNOLDS
Acting Commissioner of Patents